United States Patent [19]

Kurei

[11] 4,161,354
[45] Jul. 17, 1979

[54] TOP SHUTTER CURTAIN RELEASE MECHANISM FOR AN AUTOMATIC APERTURE VALUE CONTROL CAMERA

[75] Inventor: Hiroshi Kurei, Kawagoe, Japan

[73] Assignee: Asahi Kogaku Kogyo Kabushiki Kaisha, Tokyo, Japan

[21] Appl. No.: 828,117

[22] Filed: Aug. 26, 1977

[30] Foreign Application Priority Data

Aug. 27, 1976 [JP] Japan .................................. 51-102413

[51] Int. Cl.² .......................... G03B 7/08; G03B 9/02
[52] U.S. Cl. ........................................ 354/36; 354/43; 354/232; 354/266; 354/271; 354/272
[58] Field of Search ....................... 354/36, 37, 38, 40, 354/41, 42, 43, 232, 266, 271, 272

[56] References Cited

U.S. PATENT DOCUMENTS

| | | | |
|---|---|---|---|
| 3,777,637 | 12/1973 | Kuramoto et al. | 354/42 |
| 3,922,963 | 11/1975 | Matsui | 354/266 X |
| 3,964,073 | 6/1976 | Kobori et al. | 354/36 X |

*Primary Examiner*—Michael L. Gellner

*Attorney, Agent, or Firm*—Sughrue, Rothwell, Mion, Zinn and Macpeak

[57] ABSTRACT

An automatic camera of the aperture control type wherein the lens stopping operation is carried out by detecting the variation in light quantity due to the lens stopping operation. The finder viewing mirror is raised when the light measurement is carried out, and when the quantity of light reaches a predetermined value, the lens stopping operation is stopped. A operating member which is operated by a magnet causes both the halting of the lens stopping operation and the top curtain releasing operation. After the running of the bottom curtain, the finder viewer mirror is lowered and lens aperture is rapidly opened wide. The rapid opening of the lens aperture is accomplished with a very simple mechanism including a unidirectional clutch which operatively couple gears of a slow speed mechanism for permitting rotation of some of the gears in the return direction when a control lever member, operatively connected to the operating member, is in engagement with the first gear.

2 Claims, 7 Drawing Figures

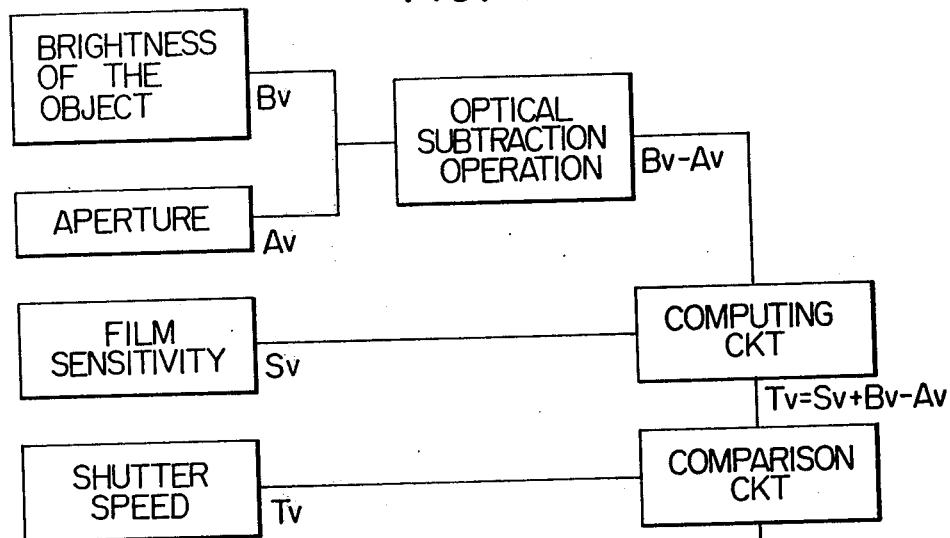
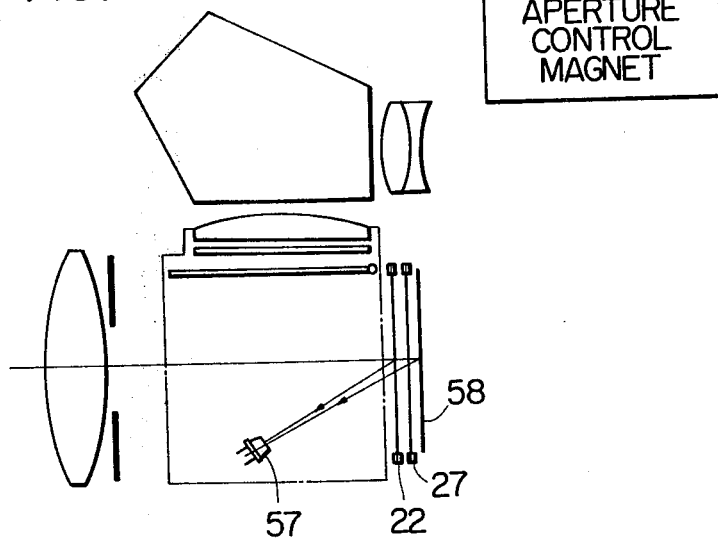

TOP SHUTTER CURTAIN RELEASE MECHANISM FOR AN AUTOMATIC APERTURE VALUE CONTROL CAMERA

BACKGROUND OF THE INVENTION

This invention relates to a top curtain releasing mechanism for an automatic exposure camera of the aperture value control type.

There are a variety of automatic exposure cameras of the aperture value control type. These can be generally divided into two kinds. The first employs a system in which the lens aperture value is related to the position of a member connected to the body side, the position of the member being controlled, for example, by a chaser thread clamp system with a meter. The second kind employs a direct lens stopping control system in which, unlike the aforementioned system, the lens aperture value is not related to the position of the member connected to the body side. Instead, the lens stopping operation is actually carried out by detecting a variation in light quantity due to the lens stopping operation so that when the quantity of light reaches a predetermined value, the lens stopping operation is halted.

SUMMARY OF THE INVENTION

This invention is an improvement in the second kind of system described above. In this system, when a light measurement by stopping the lens is effected, no variation in light quantity other than that due to the lens stopping operation is involved. During the measurement, the finder viewing mirror must have been raised or must have been at the viewing position depending on the position of the light measuring element in the camera. This invention employs a light measuring system in which the mirror takes the former position, e.g. it is raised when the light measurement is carried out.

The order of operations of the camera arranged as described above is briefly as follows:
(1) Release;
(2) Starting the mirror operation;
(3) Completing the mirror operation;
(4) Starting the lens stopping operation to start the light measurement;
(5) Controlling the aperture value;
(6) Releasing the top curtain;
(7) Lapse of a predetermined exposure time;
(8) Releasing the bottom cutain;
(9) Completing the running of the bottom curtain;
(10) Starting the mirror lowering operation; and
(11) Completing the mirror lowering operation.

In this connection, the mirror operation and the lens stopping operation must be in timed sequence. Therefore, the aforementioned system is disadvantageous in shutter actuation when compared with a conventional simultaneous start system. Furthermore, it is impossible to release the top curtain by the mirror operation which is employed conventionally, and therefore it is necessary to complement the operation of the lens stop.

Accordingly, this invention aims at providing a simple, reasonable top curtain releasing mechanism which can avoid waste with respect to a delay in shutter actuation. Another feature of the invention is the provision of a unidirectional clutch in the lens stopping mechanism which permits the lens aperture to be rapidly opened wide after the running of the bottom curtain. This results in a faster return operation being accomplished with a very simple mechanism.

BRIEF DESCRIPTION OF THE DRAWINGS

In the drawings:
FIG. 6 is a camera sectional view showing the disposition of a light sensing element,
and
FIG. 7 is a block diagram of the camera control circuit employed in this invention.

DETAILED DESCRIPTION OF THE PREFERRED EMBODIMENT

Figure 1:
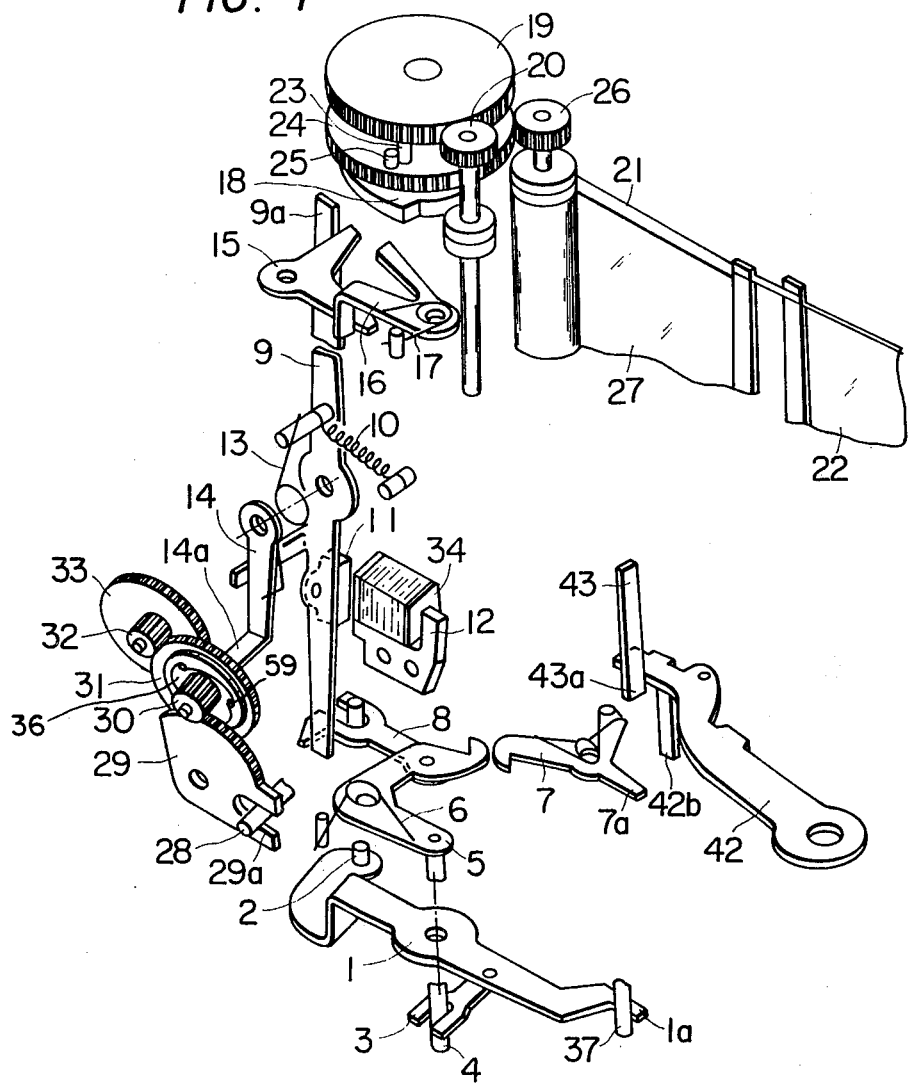
FIG. 1 is a perspective view showing a lens stop control mechanism and a top curtain locking mechanism according to this invention.

A preferred embodiment of the invention will now be described with reference to the drawings, wherein FIG. 1 shows an aperture value control mechanism and a top curtain release device, before winding. As the cam of a winding mechanism (not shown) engages a charge pin 2, a charge lever 1 is rotated clockwise (cw) during the winding operation. A set lever 5 is also rotated cw against the force of a spring 6 through a pin 4 via a fork-shaped lever 3 pivotally secured to the charge lever 1. As a result, an auxiliary set lever 8 pivotally mounted on the set lever 5 is displaced to the right in the figure, which rotates an operating lever 9 counterclockwise (ccw) against the force of a spring 10. Accordingly, an armature 11 pivotally secured to the lever 9 is brought into contact with the core 12 of an aperture control magnet 34. At the same time, a control lever 14 connected through a spring 13 to the operating lever 9 is also rotated ccw, whereby its locking pawl 14a is disengaged from a ratchet wheel 33 in the last stage of a slow speed mechanism. Furthermore, as the upper end 9a of the operating lever 9 is displaced, a top curtain locking lever 16 is rotated cw by a spring 17 via a relay lever 15 so that it is in position to engage a top curtain locking cam 18.

When the armature 11 is brought into contact with the core 12, the set lever 5 and a locking lever 7 become latchingly engaged with each other. The winding cam is designed to cause a maximum rotational displacement of the charge lever 1 during the winding operation, and thereafter the charge lever is rotated ccw and restored to its original position, whereby the fork-shaped lever 3 becomes disengaged from the pin 4.

The upper speed change gear 19 is also rotated during the winding operation, and the top curtain 22 is cocked or charged through a traction member 21 by a pinion 20 engaged with the gear 19. A speed change gear 24 is also rotated by a pin 23 secured to the gear 19 and a pin 25 secured to the gear 24, and the bottom curtain 27 is thus cocked by a pinion 26. The relative rotational position of the top curtain locking cam 18 integrally coupled to the speed change gear 19 is such that when the winding operation is completed, the cam 18 engages the top curtain locking lever 16.

The structure of the slow speed mechanism will now be described. In FIG. 1, a coupling pin 28 operates in association with an aperture release plate (46 in FIG. 5) described later, and is engaged with an elongated groove 29a in a sector-shaped gear 29 which engages a first pinion gear 30. The rotation of the gear 29 is transmitted to a ratchet wheel 33 through a spur gear 31 and a second pinion gear 32. The object of this slow speed mechanism is to "expand" the operational displacement of the aperture release plate 46, to thereby improve the control accuracy of the mechanism and to improve the durability thereof by decreasing the locking force.

Figure 2:
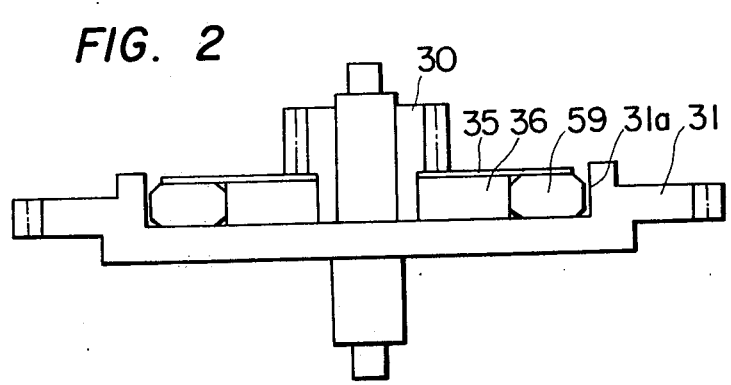
FIG. 2 is a sectional view of a uni-directional friction clutch.
Figure 3:
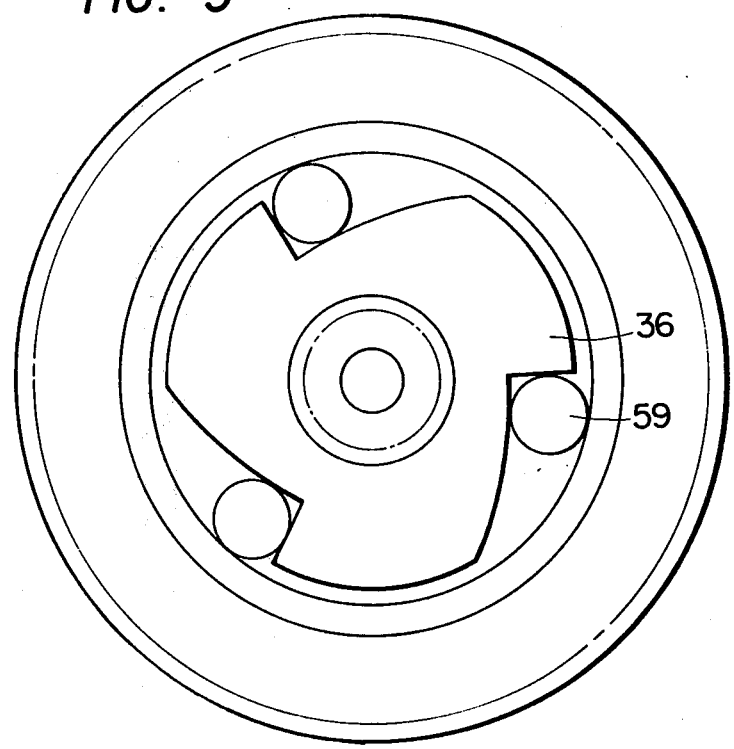
FIG. 3 is a plan view of the clutch with the cover plate removed.

The relation between the first pinion gear 30 and the spur gear is shown in FIGS. 2 and 3. A cover plate 35 and a cam plate 36 are integrally secured to the pinion gear 30, the cam plate 36 is inserted into a housing section 31a of the spur gear 31, and rollers 59 are disposed in the spaces between the cam plate and the housing section. Thus, the pinion gear 30 and spur gear 31 form a uni-directional friction clutch with the rollers 59. When the coupling pin 28 is moved upward in FIG. 1 with the operation of the lens stop, the pinion gear 30 and spur gear 31 become engaged and rotate the ratchet wheel 33. After the latter has been locked at a given aperture control value by the lever 14, such locking is not released until the followng winding operation. Therefore, when the mirror is lowered after the completion of an exposure operation and the aperture is restored to its widest opening, it is impossible to return the coupling pin 28 to its lower position. To overcome this difficulty the uni-directional clutch is thus provided between the in 28 and the ratchet wheel 33. At the time of restoration only the sector-shaped gear 29 and the first pinion gear 30 are rotated, and since the inertial resistance is thus relatively small the return speed is improved.

The mirror box mechanism will now be described. In FIG. 1 the charge lever 1 is rotated cw during the winding operation, whereby a pin 37, engaged with the end 1a of the charge lever and fixed to a drive lever 38 (FIG. 4), rotates the lever 38 clockwise. This energizes a restoring spring 39 and a mirror lifting spring 40, and a lock tab 38a engages the end notch in a latching lever 41 to retain the drive lever in a cocked position.

Figure 4:
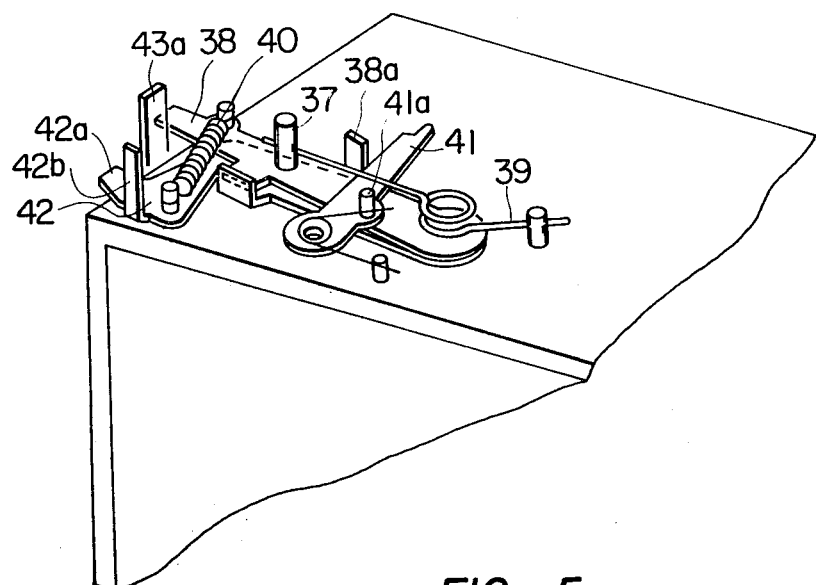
FIG. 4 is a perspective view showing the lower part of a mirror box mechanism.

Upon the cw rotation of the drive lever 38 a first operating lever 42 also rotates cw via the mirror spring 40, and the end 42a of the lever 42 engages a second operating lever 43 and tries to displace the end 43a thereof to the right in FIG. 4. The lever 43, however, as shown in FIG. 5, is locked by the bent portion 45a of a first locking lever 45, whereby tension is applied to the mirror lift spring 40.

Figure 5:
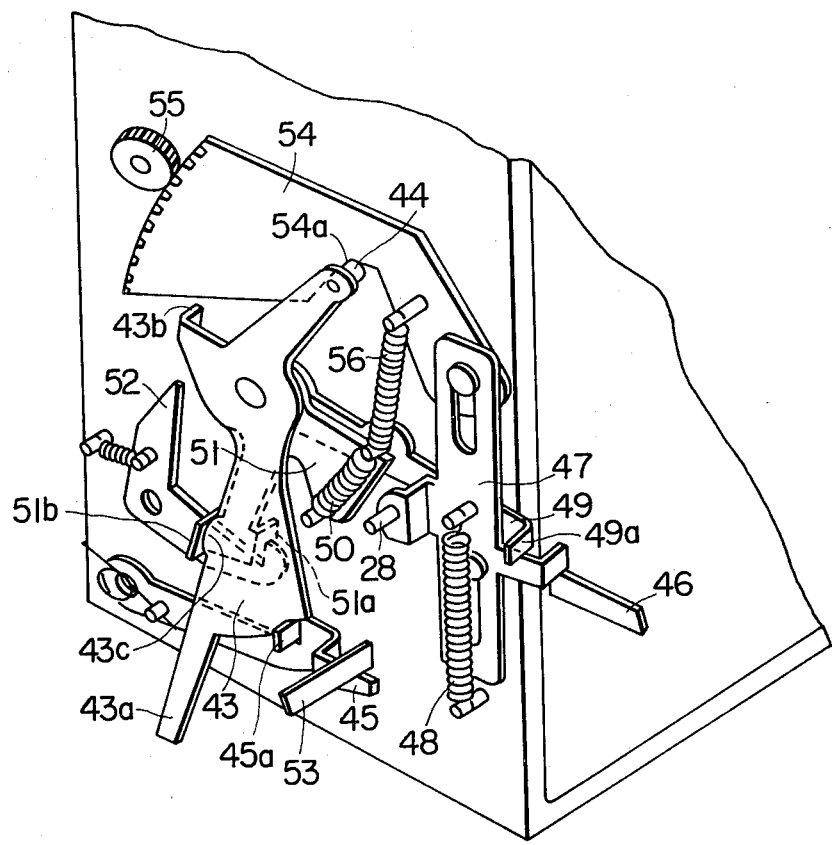
FIG. 5 is a perspective view showing the side of the mirror box mechanism.

The aperture release plate 46 is biased in a lens stopping or upward direction as viewed in FIG. 5 at all times, and therefore a slide plate 47 engaging the plate 46 is also biased upwardly against the force of a restoring spring 48. This displacement of the slide plate 47 is limited, however, by the bent end tab 49a of a restoring lever 49. The lever 49 is coupled to a lever 51 via a spring 50, and the bent tab 51a of the lever 51 is latched by a third locking lever 52.

In operation, upon the depression of a release button (not shown), a release lever 53 is moved downwardly as viewed in FIG. 5, as a result of which the first locking lever 45 is rotated cw to disengage the second operating lever 43. Accordingly, the first operating lever 42 is rotated cw as viewed in FIG. 4 by the mirror lifting spring 40, whereby the second operating lever is rotated ccw as viewed in FIG. 5. As a result, a cam pin 44 fixed to one end of the lever 43 is brought into contact with the follower surface 54a of a mirror lifting lever 54 to cam the lever 54 in a cw direction. This drives a mirror lifting gear 55 in a ccw direction to raise the reflex mirror (not shown).

During the final period of the mirror lifting operation, the bent tab 43b on the second operating lever 43 kicks the third locking lever 52 in a cw direction to thereby release the latched lever 51. Accordingly, the lever 51 and the restoring lever 49 are rapidly driven in a ccw direction by the spring 56. As a result, the slide plate 47 previously restrained by the lever 49 starts moving upwardly to stop down the lens, and the coupling pin 28 commences the operation of the slow speed mechanism shown in FIG. 1.

The set lever 5 in FIG. 1 is initially latched by the locking lever 7 as a result of the winding operation, but as the first operating lever 42 in the mirror box mechanism is rotated upon the camera release its bent tab 42b kicks the end 7a of the locking lever 7. The set lever 5 is therefore released and rotated ccw by the spring 6 to return to its original position, and simultaneously the operating lever 9 is released. By now the aperture control magnet 34 has become energized, however, whereby the amarture 11 is attracted and prevents the rotation of the lever 9.

In summary, at this point the mirror has been raised by the released operation and the lens aperture is being stopped down. The following description concerns the sensing of variations in the quantity of incident light to control the aperture value.

A light sensing element 57 is disposed in the lower part of the mirror box, as shown in FIG. 6. The side of the top curtain facing toward the lens has a light reflection factor equal to that of the film 58, and reflects light passing through the lens onto the sensing element.

FIG. 7 shows a block diagram of the camera control circuit. With the brightness of the object and the variation in light quantity due to the stopping down of the lens as inputs, a $B_V - A_V$ apex value calculation operation is automatically carried out. The film sensitivity value $S_V$ is then added to the result in accordance with the following well known equation:

$$T_V = S_V + B_V - A_V.$$

This calculated shutter speed value $T_V$ changes (decreases) as the lens is stopped down, and is compared with a shutter speed value $T_V$ manually set in advance. When both values coincide, the aperture control magnet 34 is deenergized.

The attraction of the armature 11 to the core 12 is thus released, whereby the operating lever 9 is pulled clockwise by the spring 10. This allows the spring 13 to rotate the control lever 14 clockwise, and the locking pawl 14a thus engages the ratchet wheel 33 of the slow speed mechanism to halt the movement of the stop release plate 46 via the coupling pin 28 and the slide plate 47 to thereby terminate the lens stop-down operation. The position of the control lever 14 relative to the ratchet wheel is such that these two elements become engaged as quickly as possible after the magnet 34 has been deenergized.

As the operating lever 9 is pulled cw its upper end 9a kicks the relay lever 15, whereby the locking lever 16 becomes disengaged from the cam 18 and the top curtain 22 starts its linear run.

After the preset shutter speed or exposure time has elapsed the bottom curtain 27 starts its run. During the final run of the bottom curtain the pin 41a fixed to the second locking lever 41 (FIG. 4) is kicked to rotate the lever clockwise and release the drive lever 38. Accordingly, the latter is restored to its original position by the spring 39, as is the second operating lever 43.

The bent tab 51b of the lever 51 in FIG. 5 is pushed by the protrusion 43c on the second operating lever as the latter is rotated, whereby the lever 49 is restored by the coupling spring 50. Accordingly, the slide plate 47 is also restored, whereby the lens aperture is returned to its fully open condition. Although the aperture control magnet 34 is deenergized and the ratchet wheel 33 is engaged by the control lever pawl 14a, the uni-directional clutch between the pinion gear 30 and the spur gear 31 enables the slide plate to be restored. In addition, the mirror lifting lever 54 is restored by the spring 56 to lower the mirror and the lever 51 becomes re-latched by the third locking lever 52, which completes the camera operation sequence.

Thus, according to this invention the top shutter curtain is released in response to the deenergization of the aperture value control magnet, and simultaneously the aperture stop-down operation is terminated. As a result, the camera operation time is shortened, the mechanism can be simplified and the manufacturing cost can be reduced, and the number of assembly steps can be reduced.

In addition, the unidirectional clutch between the shutter control section and the sector-shaped gear in the slow speed mechanism allows the lens aperture to be opened wide even when the slow speed mechanism is engaged by the control lever pawl 14a. It is also unnecessary to operate all the stages of the slow speed mechanism to open the lens aperture, which results in a faster return operation. Thus, the present invention is particularly advantageous when the camera is used with a motor drive mechanism in a rapid shutter sequence mode.

What is claimed is:

1. In an automatic camera of the aperture control type wherein the lens stopping operation is carried out by detecting the variation in light quantity due to the lens stopping operation with a finder viewing mirror in its raised position, said camera including a shutter having top and bottom curtains and means for cocking said top and bottom curtains, light measuring means for detecting when the light quantity is equal to a predetermined value, and means for terminating the lens stopping operation including a magnet connected to said light measuring means, said magnet being de-energized when the detected light quantity is equal to said predetermined value, the improvement comprising an operating member carrying an armature for contacting said magnet when energized, said operating member being biased to move said armature away from said magnet upon de-energization of said magnet, lens operation terminating means operatively connected with said operating member and cooperating therewith for terminating the lens stopping operation when said operating member is released by said magnet to move away from said magnet, said lens operation terminating means including a plurality of intermeshed gears having at least first and second gears, said first gear being engagable by a control lever operatively associated with said operating member, a unidirectional clutch means operatively coupling at least two of said gears for permitting rotation of some of said gears in the return direction even when said control lever engages and stops rotation of said first gear and for preventing further lens stopping operation when said first gear is engaged and stopped by said control lever, and top curtain release means operatively connected with said operating member and cooperating therewith for releasing said top curtain when said operating member is released by said magnet to move away from said magnet whereby the release of said top curtain and the termination of the lens stopping operating occur simultaneously at a time following the raising of said viewing mirror.

2. In an automatic camera of the aperture control type wherein the lens stopping operation is carried out by detecting the variation in light quantity due to the lens stopping operation with a finder viewing mirror in its raised position, said camera including a shutter having top and bottom curtains and means for cocking said top and bottom curtains, light measuring means for detecting when the light quantity is equal to a predetermined value, and means for terminating the lens stopping operation including a magnet connected to said light measuring means, said magnet being de-energized when the detected light quantity is equal to said predetermined value, the improvement comprising an operating member carrying an armature for contacting said magnet when energized, said operating member being biased to move said armature away from said magnet upon de-energization of said magnet, lens operation terminating means operatively connected with said operating member and cooperating therewith for terminating the lens stopping operation when said operating member is released by said magnet to move away from said magnet, and top curtain release means operatively connected with said operating member and cooperating therewith for releasing said top curtain, when said operating member is released by said magnet to move away from said magnet whereby the release of said top curtain and the termination of the lens stopping operation occurs simultaneously at a time following the raising of said viewing mirror, a slow speed mechanism for controlling the speed of the lens stopping operation, said slow speed mechanism comprising a plurality of intermeshed gears adapted to be operatively coupled with said aperture, said gears capable of operating in a first stopping down direction and in an opposite return direction, said lens operation terminating means comprising a control lever pivotally mounted for engaging and stopping rotation of a first of said intermeshed gears, said means for cocking said top curtain including a locking lever for engagement with a top curtain locking cam, said operating member being displaced upon the de-energization of said magnet to cause said control lever to engage said first gear so as to stop the lens stopping operation and to release the engagement of said top curtain locking cam by said locking lever so as to release said top curtain, said slow speed mechanism including a unidirectional clutch means operatively coupling at least two of said gears for permitting rotation of some of said gears in the return direction even when said control lever engages and stops rotation of said first gear and for preventing further lens stopping operation when said first gear is engaged and stopped by said control lever.

* * * * *